April 11, 1939. K. D. WILLIAMS 2,153,605

SHOCK ABSORBING WASHER

Filed Feb. 28, 1938

INVENTOR
KARL D. WILLIAMS
BY
ATTORNEY

Patented Apr. 11, 1939

2,153,605

UNITED STATES PATENT OFFICE 2,153,605

SHOCK ABSORBING WASHER

Karl D. Williams, Washington, D. C.

Application February 28, 1938, Serial No. 192,961

4 Claims. (Cl. 85—50)

(Granted under the act of March 3, 1883, as amended April 30, 1928; 370 O. G. 757)

This invention relates to a shock absorbing washer, and has for an object to provide a washer of stiff, yet springy, material for absorbing shocks and relieving stresses on anchor bolts of furnaces, especially when used on vessels, and more particularly on war vessels. The boilers of vessels undergo a great deal of vibration during use, due to the motion of the vessel, the difference in the expansion rate of the furnace wall and the anchor bolt when lighting off a boiler, and vibration caused by panting when insufficient air is supplied to a boiler in use. As a result thereof, anchor bolts often appear to be loose during the period when the bolt has expanded more rapidly than the furnace wall, only to have the proper tightness after both the wall and the bolt have been thoroughly heated up. Bolts thus appearing to be loose are often tightened up by the furnacemen, with the result that when full expansion of both parts had taken place the bolt head snaps off under the vibration of the vessel. Such vibration is even more greatly increased and failure even more certain in the case of a war vessel firing its guns.

It is a further object of this invention to provide a washer especially intended for use on such bolts for absorbing such shocks and vibrations and permitting the bolt to maintain a proper degree of tightness at all times, without being in danger of snapping its head off.

With the foregoing and other objects in view, the invention consists in the construction, combination and arrangement of parts hereinafter described and illustrated in the drawing, in which, Fig. 1 is a sectional view of a furnace wall showing a particular application of this invention.

Figure 4:
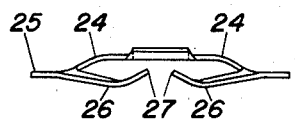
Fig. 4 is an edge view of the shock absorbing washer.
Figure 2:
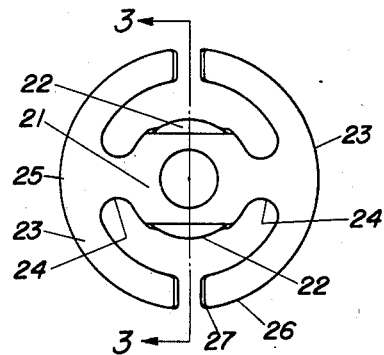
Fig. 2 is a top plan view of the shock absorbing washer of this invention.
Figure 3:
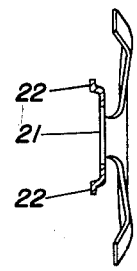
Fig. 3 is a sectional view on line 3—3 of Fig. 2.
Figure 1:
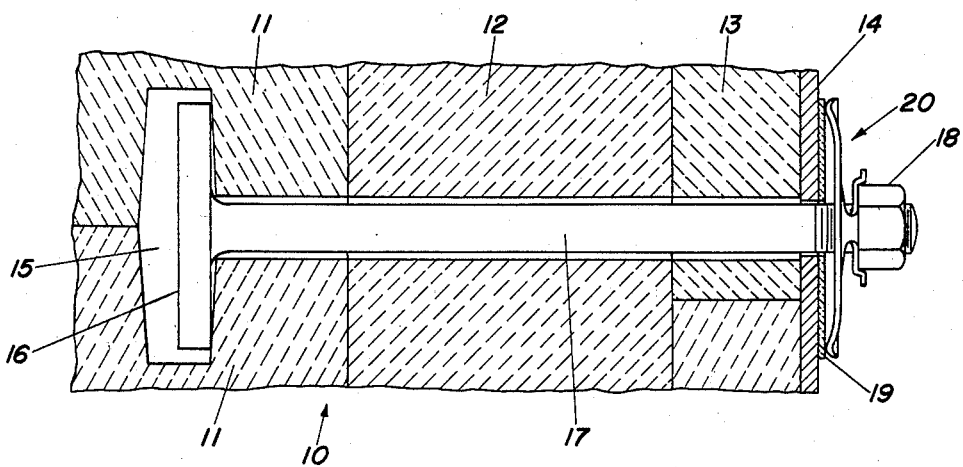

There is shown at 10 a furnace wall to which this invention has been applied. This furnace wall includes the fire brick 11 and insulating brick 12 and 13, against which is placed the steel shell 14 of the furnace wall. The fire brick 11 are each provided with a half recess 15 to receive the bolt head 16, while the bolt shank 17 passes through the insulating brick and shell to the outside thereof where the nut 18 is to be placed. As shown in Fig. 1 the nut 18 is octagonal rather than hexagonal so that it may be rotated more easily. The difference in the rate of expansion of the frangible material and the material in the anchor bolt during the heating and cooling of a boiler causes varying stresses in the anchor bolt. Between the nut 18 and the wall shell 14 is placed a flat washer 19 and the shock absorbing washer 20 of this invention, the nut 18 being hand tightened while the furnace is cool to provide the proper degree of tightness. This shock absorbing washer 20 includes a center ring 21 provided with oppositely extending raised cheeks 22, the distance between the cheeks 22 being equal to the width of the nut between opposite faces. The ring 21 is supported on the arcuate portions 23 by means of sloping bridge portions 24. The arcuate portions 23 do not occupy but a single plane, but instead they slope down from the high point 25 opposite the bridge members 24 to the low point 26 and then reverse themselves into upturned lips 27. The sloping bridge members 24 are thus spaced both from the bolt and nut to be placed on the nut receiving ring and from contact with the furnace wall. During heating of the furnace the bolt shank and nut are exposed to extremely high temperatures, part of which temperatures is naturally conducted through the shank of the bolt to the nut and thus to the washer. The heat thus conducted to the nut heats the surrounding air, causing convection currents to rise and thus bring a bath of cooling air to wash about the sloping bridge members, and it has been found that such cooling air is sufficient to maintain the sloping bridge members at a temperature below which they would lose their resiliency. The spring and shock absorbing qualities of the washer are thus indefinitely maintained in spite of the high temperatures to which the bolt and nut are exposed.

In operation, the washer 20 is placed over the flat washer 19 against the furnace wall shell 14 about the end of the bolt shank 17. The nut 18 is then threaded thereon, the sides thereof being placed between cheeks 22 and the tightening continued by hand pressure until the low points 26, of which there are four, contact against the washer 19 and resist further turning. As thus tightened it has been found that the bolt and nut maintain the proper degree of tightness at all times and that there is no shearing off or snapping of the bolt head 16 from the bolt shank 17, as has been found almost inevitable with all former methods of assembling the same.

Other modifications and changes in the proportions and arrangements of the parts may be made by those skilled in the art without departing from the nature of the invention, within the range of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A high temperature furnace anchor bolt shock absorbing washer comprising a center ring against which the nut may abut, a pair of sloping arcuate portions of substantially greater diameter than said center ring and having low points to abut the furnace wall, sloping bridge members connecting the arcuate portions to the center ring in substantially spaced planes, whereby said sloping bridge members are exposed to air currents induced by the high temperature sufficient to maintain the temperature of said sloping bridge members at a point below which they would lose their resiliency, and upstanding oppositely disposed cheeks on said center ring spaced apart a distance equal to the width of the nut between opposite faces on the bolt.

2. A shock absorbing washer of spring material for use on high temperature furnace anchor bolts, said washer including a pair of oppositely disposed arcuate portions, each having a pair of low supporting points, a nut receiving ring member of substantially less diameter than said arcuate portions disposed between said arcuate portions and sloping bridge members supporting said center ring in a plane above said arcuate portions, whereby said sloping bridge members are exposed to air currents induced by the high temperature sufficient to maintain the temperature of said sloping bridge members at a point below which they would lose their resiliency.

3. A shock absorbing washer of spring material for use on high temperature furnace anchor bolts, said washer including a pair of oppositely disposed arcuate portions, each having a pair of low supporting points, a nut receiving ring member of substantially less diameter than said arcuate portions disposed between said arcuate portions and sloping bridge members supporting said center ring in a plane above said arcuate portions, whereby said sloping bridge members are exposed to air currents induced by the high temperature sufficient to maintain the temperature of said sloping bridge members at a point below which they would lose their resiliency, and a pair of oppositely disposed raised cheeks spaced apart a distance equal to the width of the nut between opposite faces being placed therebetween.

4. A shock absorbing washer of spring material for use on high temperature furnace anchor bolts, said washer including a pair of oppositely disposed arcuate portions, each having a pair of low supporting points, a ring member disposed between said arcuate portions, sloping resilient bridge members connected to and supporting said center ring in a plane above said arcuate portions, and a pair of oppositely disposed raised cheeks on the periphery of said center ring spaced apart a distance equal to the width of the nut between opposite faces to be placed against said center ring therebetween, each arcuate portion having an upwardly turned lip extending from each low point, the diameter of said arcuate portions being substantially greater than the diameter of said center ring, whereby said sloping bridge members are spaced both from the high temperature of the furnace wall and of the bolt shank and nut and are exposed to cooling air currents induced by said high temperatures to thereby be maintained at a temperature below which they would lose their resiliency.

KARL D. WILLIAMS.